United States Patent [19]

Miller

[11] 4,441,844
[45] Apr. 10, 1984

[54] PORTABLE PANEL SEPARATION DEVICE

[76] Inventor: Curtis D. Miller, 24203 NE. Oregon St., Troutdale, Oreg. 97060

[21] Appl. No.: 367,464

[22] Filed: Apr. 12, 1982

[51] Int. Cl.³ .............................................. B65G 59/02
[52] U.S. Cl. ...................................... 414/117; 29/239; 225/103; 271/42
[58] Field of Search ............... 414/112, 113, 114, 117, 414/904; 271/18, 42; 225/103; 29/239; 242/56.4

[56] References Cited

U.S. PATENT DOCUMENTS

| 3,067,885 | 12/1962 | Kohler | 414/114 |
| 3,866,883 | 2/1975 | Goransson | 29/239 X |
| 4,195,759 | 4/1980 | Rogers | 225/103 |
| 4,324,519 | 4/1982 | Moore | 414/113 X |

FOREIGN PATENT DOCUMENTS 2433128 1/1976 Fed. Rep. of Germany ...... 414/114

Primary Examiner—Leslie J. Paperner

[57] ABSTRACT

A portable separating device which can be taken from stack to stack. At a desired stack, it is placed onto and supported by the top of the stack. It has opposed, vertically staggered, stack-engaging pads so located that one engages an edges of the top panel, whereas the other engages the edges of one or more of the lower panels. A mechanism moves the pads toward one another to apply shearing force to the top panel to shift it together with the device relative to the remainder of the stack. The grip is then released and the device lifted off. Then the top panel is removed, and the device applied to the next lower panel and the separating step repeated.

3 Claims, 5 Drawing Figures

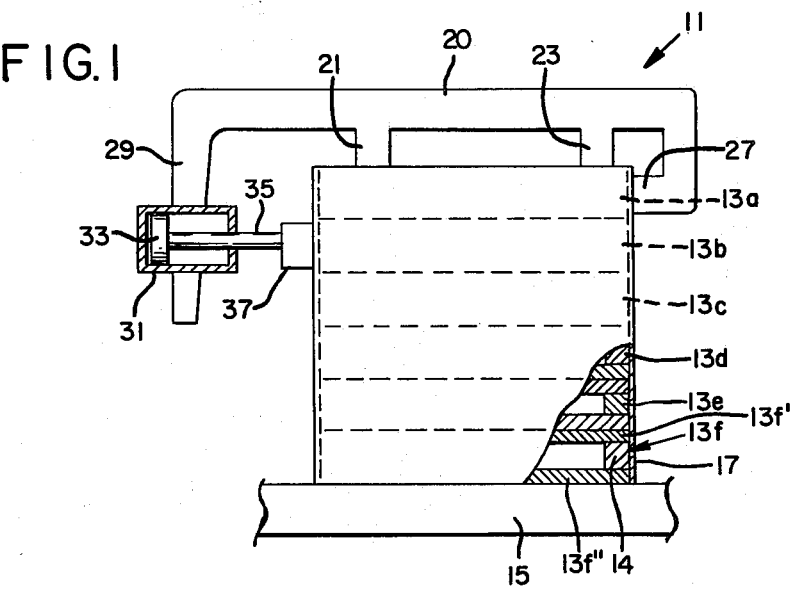
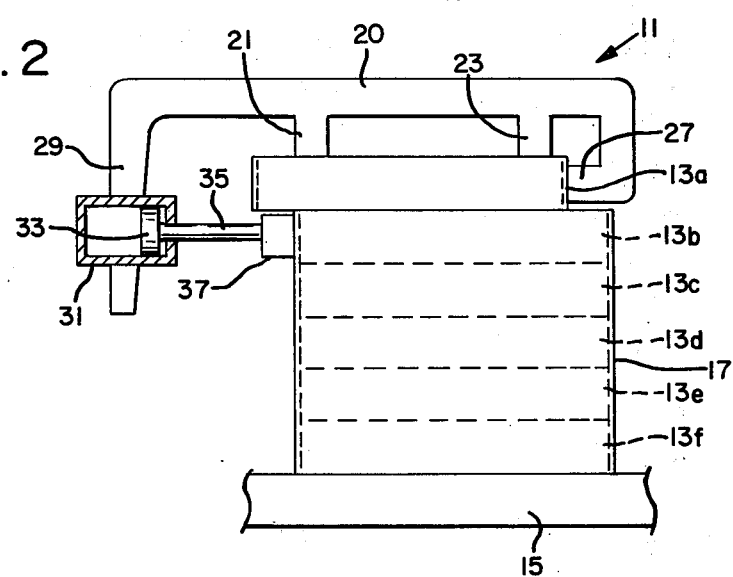
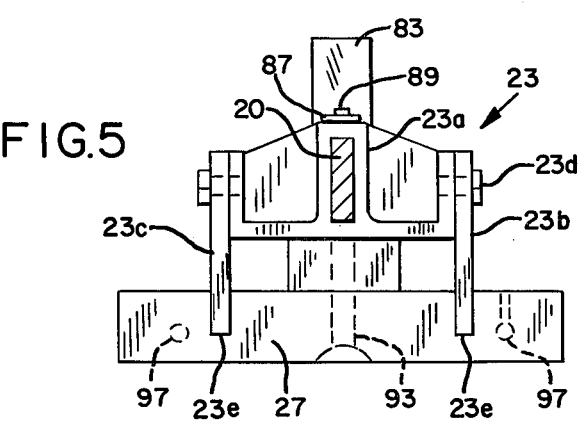

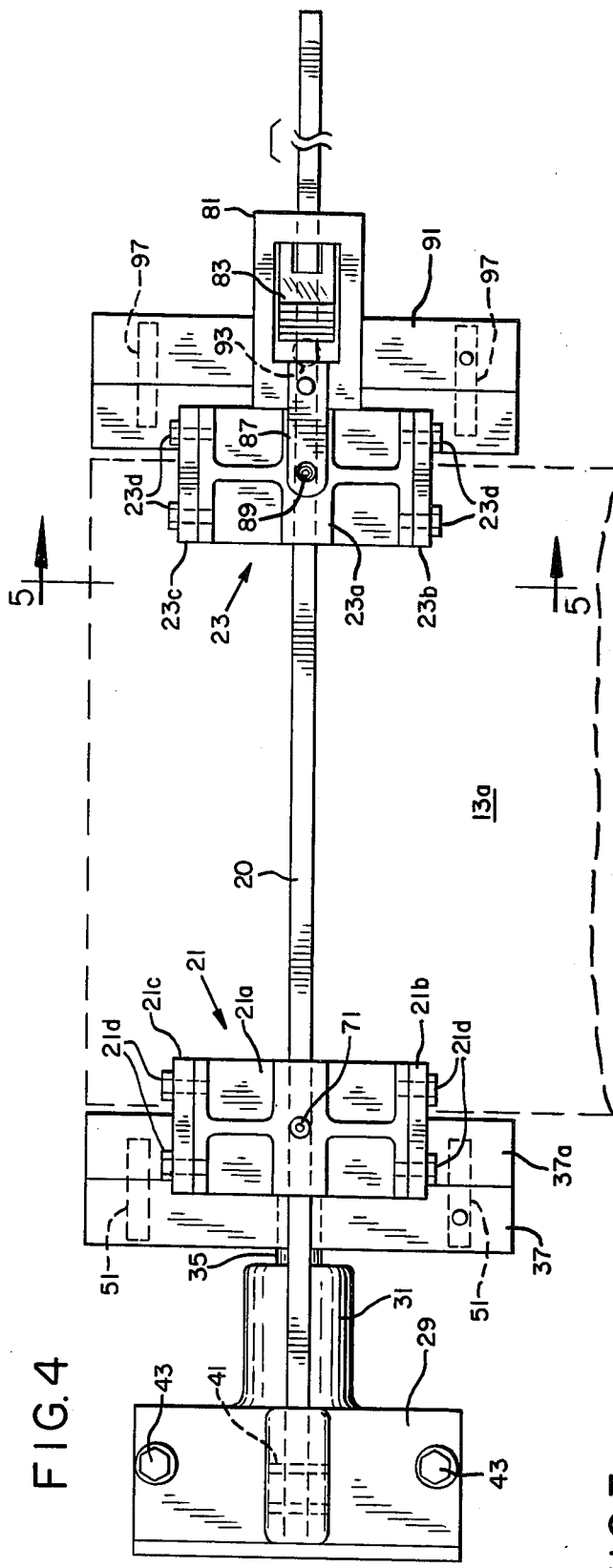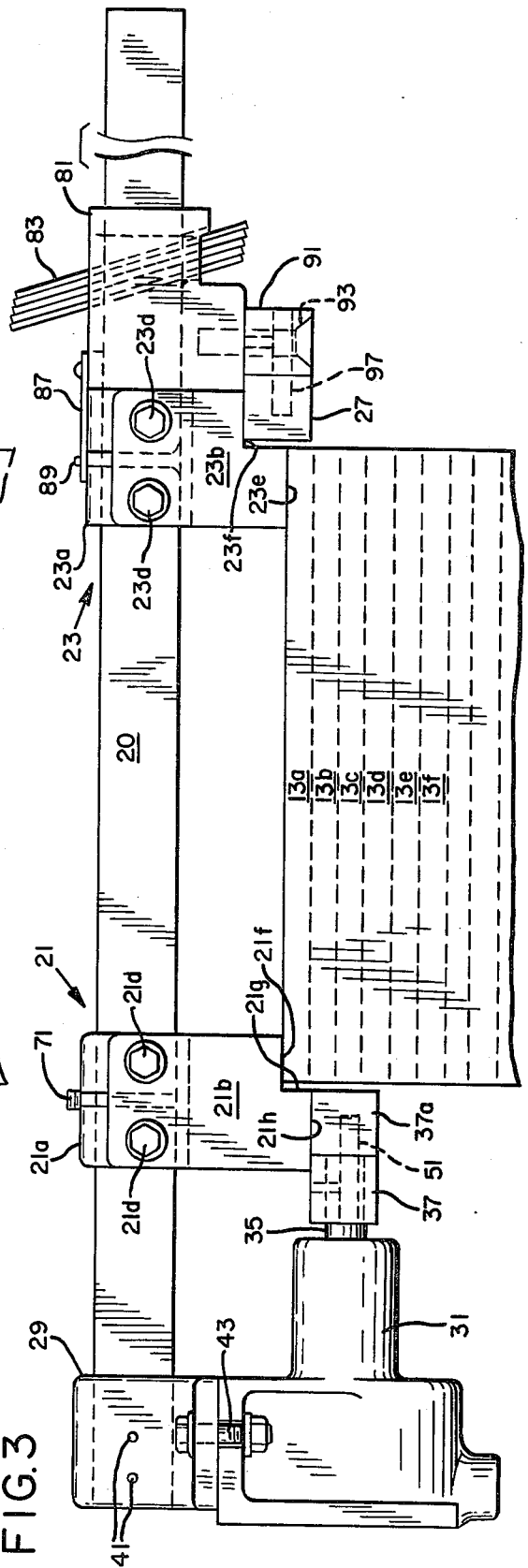

PORTABLE PANEL SEPARATION DEVICE

BACKGROUND OF THE INVENTION

This invention relates to a portable separator device, and particularly one for separating panel units from one another.

Sections of insulated glass are typically formed by the stack process, wherein sheets of glass are laid up, with alternate pairs of glass sheets being separated by marginal strips. When a pair of sheets and the interposed stripping is sealed around the edges, a section of insulated glass is produced. Such a section is herein called a panel.

In the stack process, rather than trying to seal the edges of the inchoate panels individually, it is more economical to do it all at once. Thus a plastic sealant is painted or sprayed onto the entire surfaces of the four sides of the stack to completely cover them. When the sealant dries, the resulting film not only provides the proper seal at the edges of the panels, but inadvertently bonds the panels to one another at their parting planes. At present, the panels are separated by manually running a razor around the stack at such places. This is a time-consuming and expensive operation.

I have overcome this problem by providing a portable separating device which can be taken from stack to stack to do its job. At a desired stack, it is simply placed onto and supported by the top of the stack. It has opposed, vertically staggered stack-engaging pads so located that when the device is actuated, they are moved relatively toward one another to grip the stack and apply a shearing force to the top panel to shift it relative to the remainder of the stack an extent to rupture the plastic film at the parting plane between the top panel and the next lowermost one. The grip of the device is then released and it is lifted off. Then, the top panel is removed, and the device applied to the next lowest panel, and the separating step repeated.

More specifically, I have provided a portable panel separator having a beam of a length to horizontally span a stack, and equipped with a pair of feet to support it on the top of the stack. At one end, the beam has a stack-engaging pad which is so vertically located relative to the supporting surfaces of the feet, that the feet dispose the pad in alignment with the associated edge of the top panel, but above the lower panels.

At its other end, the beam has an actuator, such as a piston and cylinder unit. The piston rod carries a second stack-engaging pad which is so located relative to the supporting surfaces of the feet, that the feet dispose the pad next to the side of the stack at a level below that of the top panel.

When the cylinder unit is actuated the second pad is forced horizontally against the panels below the top one. This pulls the first pad against the associated edge of the top panel, so that the pads apply a shearing action to the stack. Since the resistance to movement of the top panel is less than that of the next lower panel, the entire device, except for the piston rod and its pad, shifts horizontally relative to the stack, carrying the top panel with it. The amount of movement need only be sufficient to rupture the seal between the top two panels. The device is then lifted, the top panel removed, the device replaced and the operation repeated.

The main object of the present invention is to provide a device facilitating separation of a stack of panels which are secured to one another by a film or layer at their edges.

A more specific object is to provide such a device which is portable, and particularly one that is readily adjustable for different thicknesses and sizes of panels.

The subject matter which I regard as my invention is particularly pointed out and distinctly claimed in the concluding portion of this specification. The invention, however, both as to organization and method of operation, together with further advantages and objects thereof may best be understood by reference to the following description, taken in connection with the following drawings, wherein like reference characters refer to like elements.

FIG. 1 is a schematic elevational view of my separator device applied to a stack of panels;

FIG. 2 is a view like FIG. 1, but showing the device having been actuated to shift the top panel;

FIG. 3 is a vertical elevational view of a device embodying the concepts of the present invention, showing the same mounted on a stack of panels to be separated;

FIG. 4 is a plan view of the separator device; and

FIG. 5 is a sectional view taken along line 5—5 of FIG. 4.

DESCRIPTION

FIGS. 1 and 2 are schematic drawings in which, for convenience in illustration, their dimensions are distorted so that important relationships, functions, and movements can more readily be understood or seen.

FIG. 1 shows a device 11 of my invention having been placed on and supported by a stack 13 of insulated glass panels. The stack is shown as comprising only six panels, identified as 13a–13f. Typically, there would be many more. The lay up method is conventional, and comprises laying up sheets of glass, with alternate pairs being separated at their margins by separating material in the form of strips. FIG. 1 identifies the sheets 13f' and 13f'' of panel 13f, and the strips 14 of such panel.

The laid up stack then has a plastic sealant applied to all four of its sides to completely cover them. When the sealant dries, it provides a plastic coat or film 17, which not only properly seals the edges of the various panels, but also inadvertently secures or bonds the panels to one another at their parting planes. It is this bond that needs to be ruptured or broken.

My separator device is to perform this function. It comprises a beam 20 having feet 21 and 23 resting on the stack, and specifically on the top panel 13a, whereby the device is supported by the stack. At its right end, as the parts are shown, the device has a pad or stop 27. The beam plus the pad may be considered as a J-shaped member. The feet function as depth guides to automatically locate the pad opposite the associated edge of the top panel 13a, but above the edges of the lower panels.

At its left end, the beam has a bracket 29 supporting an actuator, which is shown in the form of a pneumatic piston and cylinder unit 31. The unit has a piston 33 whose piston rod 35 carries a pad 37. The latter is vertically located by the feet 21 and 23 at a level below that of the top panel 13a, preferably horizontally opposite the associated edge of the next lower panel 13b.

Now, if the piston and cylinder unit is actuated, the pad 37 will apply a horizontal thrust against the side of the stack, which is resisted by the engagement of the pad 27 with the top panel. This creates a shearing action. The resistance to movement of the top panel is less than that of panel 13b engaged by the pad 37. Therefore, the pad 37 and the piston rod remain stationary, but the reactive force causes the entire separator device, except for the rod and the pad, to be shifted to the left as shown in FIG. 2, carrying the top panel 13a with it. This ruptures the plastic film 17 at the parting plane between the top panel 13a and the next lowest panel 13b, without harming the edge bond at the edges of either panel. Now the clamping pressure is relaxed, the device lifted, the top panel pulled off the stack, the device replaced, and the operation repeated on the remaining panels in turn.

FIGS. 3-5 show a device embodying my invention, wherein the proportions are more realistic than in FIGS. 1 and 2. The beam 20 is shown as comprising a spring steel bar on which the depth guide feet 21 and 23 are mounted, in a manner to be presently explained.

At the left hand end of the bar, as the parts are shown in FIGS. 3 and 4, the bracket 29 has a through bore, receiving the left hand end of the bar 20, the bracket being secured to the bar by screws 41.

The pneumatic piston and cylinder unit 31 is hung by bolts 43 from the bracket 29. The piston and cylinder unit has its piston rod 35 projecting therefrom and projecting into and secured to the pusher bar 37. The pusher bar is provided with a plastic face pad 37a, which has fixed pins 51 fitting in holes provided in the pusher bar and held in place by set screws.

The depth guide foot 21 has a bracket 21a formed with a through bore to receive the bar 20, the foot being secured to the bar by a screw 71 (FIG. 4). From the lateral ends of the bracket 21a are secured a pair of depth guide plates 21b and 21c which are secured to the bracket 21a by bolts 21d.

The two depth guide plates are notched at their lower ends to provide edges 21f for contact with the upper panel 13a, and edges 21g for disposition next to the left side of the stack, as the parts are shown in FIG. 3. The lower edges 21h of the plates slidably rest on the upper faces of the face pad and the pusher bar. The importance of this will be evident presently.

The other depth guide foot 23 has a bracket 23a from the lateral end of which depend a pair of depth guide plates 23b and 23c secured to the bracket by bolts 23d. The depth guide plates have lower edges 23e for contact with the upper surface of the stack, and more specifically the top panel.

The bar 20 slidably extends through the bracket 23a but is releasably held in a desired position of adjustment along the bar by an adjustable tail block 81. There are plural stop plates 83 formed with rectangular holes to receive the bar with sufficient looseness that the stop plates can assume the positions in FIG. 4 inclined to the vertical, with their interior edges biting into the bar 20. The tail block has a spring tongue 87 secured at its left hand end to releasably fit onto an upwardly projecting pin 89 on the bracket 23a.

A stop or pusher bar 91 is accommodated within notches 23f of the plates 23b and 23c and is pivotally connected to the tail block by a single bolt 93. The bar carries the pad 27 which is secured to the backup bar by a pair of pins 97 (compare FIGS. 3 and 4). The notches 23f provide downwardly facing edges slidably resting on the upper face of the plastic face pad 27.

It is important to note that the depth guide plates 23c and 23d will locate the lower face of the plastic face pad just above the plane separating the uppermost panel 13a from the next lower panel 13b, while the plates 21b and 21c dispose the pad 37a below the top panel 13a and opposite the associated edges of panels 13b-13d.

In operation, when the pneumatic piston and cylinder unit is actuated, a thrust force is applied by the piston and cylinder unit through the pad 37a to the stack 13. This thrust force transmitted by the bar 20 to the face pad 27, pulls the latter against the upper panel 13a. Since the left hand face pad 37 meets more resistance to moving the panels it contacts than does face pad 27 to moving the uppermost panel, the entire separator device, except for the face pad 37a and pusher bar 37 and piston rod 35, shift to the left, carrying panel 13a with it, to rupture the film bond between the uppermost panel and the next lower one. Note that when the device moves to the left, the depth guide plates simply slide on the bar 37 and pad 37a.

Now the supply of air under pressure is terminated to release the grip of the device on the stack. The device can simply be lifted off, the panel 13a removed and the device replaced onto the next uppermost panel 13b and the operation repeated to separate it from the next lowermost panel.

If it is desired to shift the foot 23 along the bar 20 to adjust the device to wider stacks, the workman manually moves the set of stop plates 83 to a more upright position, against the resistance of a conventional bent wire spring (not shown), to release the grip of the stop plates 83 on the bar 20.

With stacks of small sized panels, it is possible to locate the separator device 11 approximately centrally of the panels, whereby the uppermost panel to be separated will be shifted to the left breaking the film bonds at the four sides of the stack and maintaining the upper panel in essentially a rectilinear line of movement.

However, with larger panels, particularly longer ones, I have discovered it is better to locate the separator device near one end of the stack of panels and run it through its sequence of operation. This time, however, when the piston and cylinder unit is actuated, the end of the uppermost panel at which the separator device is located will be shifted the extent of travel of the piston and cylinder unit 31, whereas the opposite end is shifted oppositely, so that the uppermost panel is now askew with reference to the lowermost panels, to break the bond between the panels. In order to accommodate this movement, the bar 91 as previously mentioned is pivoted at 93 to enable the bar and the pad to turn to maintain flush contact with the uppermost panel even though the uppermost panel is askew to the lower panels in the stack.

While my device may entirely separate an upper panel from the next lower one, with some panel sizes, the separation may be less than complete. However, the workman need only give the upper panel a final twist to complete the separation. Or, two devices could be provided, and located adjacent the opposite ends of the stack, to effect a complete separation.

As is evident from FIG. 3, the bins which mount the face pads to their bars are offset from the horizontal midplanes of the pads. This means that the bolts can be removed, the face pads inverted and resecured, whereby to locate the pads lower faces at a lower level than was previously the case. This means that with a simple adjustment, the unit shown is adaptable to operate on panels of two thicknesses rather than just one. To adapt the device to other thicknesses of panels, the guide feet can be replaced by feet having different sized notches.

Lifting of the spring tongue 87 permits separation of the tail block 81 from the bracket 23a. This enables the pad 27 to be inverted without removing the pad 91 from the tail block.

Preferably the depth guide plates are formed of a plastic material for easier contact with the glass panels.

Instead of mounting the stop plates 83 so that they engage the upper and lower edges of the beam 20, the plates may be arranged to project horizontally and thus engage the sides of the beam, so that the upper and lower edges are not roughened by the action of the stop plates. The beam may be of I-shape in cross section, with the stop plates engaging the recessed portions of the sides of the beam.

The source of air under pressure has not been shown. It may be that source typically available in shop surroundings, which will be connected by a hose to a foot pedal control (not shown) for controlling the supply of air to the piston and cylinder unit.

What is claimed is:

1. A portable separator device comprising a beam to span a stack of panels to be separated,
    a pair of feet means carried by the beam in spaced relation therealong to adapt the device to be supported solely by contact with the top of such stack at spaced places thereon,
    a stop member carried by the beam at one end for disposition at one side of the stack,
    a power unit carried by the beam at the other end thereof and having a stack engaging member for disposition at the opposite side of the stack,
    said feet means acting as depth guides to vertically dispose said stop member at a level even with the associated edge of the uppermost panel, and to vertically dispose said stack engaging member below the just mentioned level,
    and means to facilitate actuation of said power unit to cause it to bodily shift said beam horizontally relative to the stack and carry the uppermost panel with it,
    at least one of said feet means being mounted for adjustable movement along said beam.

2. A portable separator device comprising a beam to span a stack of panels to be separated,
    said beam having feet means for supporting the beam on the top of such stack,
    a stop member carried by the beam for disposition at one side of the stack,
    a power unit carried by the beam and having a stack engaging member for disposition at the opposite side of the stack,
    said feet means acting as depth guides to vertically dipsose said stop member at a level even with the associated edge of the uppermost panel, and to vertically dispose said stack engaging member below the just mentioned level,
    and means to facilitate actuation of said power unit to cause it to bodily shift said beam horizontally relative to the stack and carry the uppermost panel with it,
    said stop member and said stack engaging member each including a face pad,
    and means mounting the pads permitting their inversion whereby they can assume different vertical positions with respect to their original positions.

3. A portable separator device comprising a beam to span a stack of panels to be separated,
    said beam having feet means for supporting the beam on the top of such stack,
    a stop member carried by the beam for disposition at one side of the stack,
    a power unit carried by the beam and having a stack engaging member for disposition at the opposite side of the stack,
    said feet means acting as depth guides to vertically dispose said stop member at a level even with the associated edge of the uppermost panel, and to vertically dispose said stack engaging member below the just mentioned level,
    and means to facilitate actuation of said power unit to cause it to bodily shift said beam horizontally relative to the stack and carry the uppermost panel with it,
    means mounting said stop member for tilting movement for maintaining flush contact with a top panel whenever the top panel is shifted askew to the underlying panels.

* * * * *